United States Patent
Stoller et al.

(10) Patent No.: US 7,596,451 B2
(45) Date of Patent: Sep. 29, 2009

(54) MOBILE-MACHINE NAVIGATION SYSTEM

(75) Inventors: Jason Stoller, Princeville, IL (US);
Makoto A. Inoue, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 453 days.

(21) Appl. No.: 11/326,506

(22) Filed: Jan. 6, 2006

(65) Prior Publication Data

US 2007/0162219 A1 Jul. 12, 2007

(51) Int. Cl.
*G01C 21/36* (2006.01)
*B62D 61/00* (2006.01)
(52) U.S. Cl. .................. 701/210; 701/23; 701/213; 701/205; 340/436; 340/995.21; 180/168; 700/56; 700/253; 700/302
(58) Field of Classification Search .................. 701/78, 701/205, 206, 226, 225, 253, 302
See application file for complete search history.

(56) References Cited

U.S. PATENT DOCUMENTS

| | | | |
|---|---|---|---|
| 3,893,536 A * | 7/1975 | Marshall et al. ............. 180/168 |
| 5,029,088 A | 7/1991 | Minami |
| 5,262,775 A * | 11/1993 | Tamai et al. ........... 340/995.21 |
| 5,563,787 A | 10/1996 | Murayama |
| 5,684,696 A | 11/1997 | Rao et al. |
| 5,752,207 A | 5/1998 | Sarangapani |
| 5,764,510 A | 6/1998 | Cameron et al. |
| 5,918,682 A * | 7/1999 | Fan et al. ....................... 172/2 |
| 5,925,080 A | 7/1999 | Shimbara et al. |
| 6,062,317 A * | 5/2000 | Gharsalli et al. ................ 172/2 |
| 6,092,007 A * | 7/2000 | Cotton et al. .................... 701/4 |
| 6,141,613 A * | 10/2000 | Fan .............................. 701/50 |
| 6,178,379 B1 | 1/2001 | Dwyer |
| 6,226,573 B1 | 5/2001 | Okawa et al. |
| 6,272,405 B1 | 8/2001 | Kubota |
| 6,321,159 B1 | 11/2001 | Nohtomi et al. |
| 6,442,456 B2 | 8/2002 | Burns et al. |
| 6,445,984 B1 | 9/2002 | Kellogg |
| 6,445,990 B1 * | 9/2002 | Manring ...................... 701/50 |
| 6,489,887 B2 * | 12/2002 | Satoh et al. .................. 340/436 |
| 6,510,385 B2 | 1/2003 | Hijikata |
| 6,580,978 B1 * | 6/2003 | McTamaney ................. 701/23 |
| 6,636,807 B1 * | 10/2003 | Glasmacher et al. ........ 701/213 |
| 6,701,248 B2 | 3/2004 | Petzold et al. |

(Continued)

OTHER PUBLICATIONS

R.W. Hogg, A.L. Rankin, S.L. Roumeliotis, M.C. McHenry, D.M. Helmick, C.F Bergh, L Matthies, "Algorithms and Sensors for Small Robot Path Following" Proc. 2002 IEEE Int. Conf on Robotics and Automation, pp. 3850-3857.*

*Primary Examiner*—Thomas G Black
*Assistant Examiner*—Lin B Olsen
(74) *Attorney, Agent, or Firm*—Finnegan, Henderson, Farabow, Garrett & Dunner

(57) ABSTRACT

A method of navigating a mobile machine dependent upon the relationship of the mobile machine to a target path includes operating a steering system to change the heading of the mobile machine in response to the mobile machine deviating from a first navigational dead band. Additionally, the method may include subsequently operating the steering system to make a heading change of the mobile machine only in response to predetermined events, which may include operating the steering system to make a heading change of the mobile machine if the mobile machine deviates from a second navigational dead band.

31 Claims, 10 Drawing Sheets

U.S. PATENT DOCUMENTS

| | | |
|---|---|---|
| 6,728,633 B2 | 4/2004 | Mikuriya et al. |
| 6,804,587 B1 | 10/2004 | O'Connor et al. |
| 7,228,232 B2 * | 6/2007 | Bodin et al. ................ 701/301 |
| 2002/0072850 A1 * | 6/2002 | McClure et al. ............. 701/213 |
| 2003/0187577 A1 * | 10/2003 | McClure et al. ............. 701/213 |

* cited by examiner

MOBILE-MACHINE NAVIGATION SYSTEM

TECHNICAL FIELD

The present disclosure relates to mobile machines and, more particularly, to systems and methods for navigating mobile machines.

BACKGROUND

Many machines are mobile machines that travel in order to perform one or more functions. For example, many earth moving machines move earth by traveling with an earth moving tool engaging the ground. In many circumstances a mobile machine may need to travel on or close to a particular path in order to properly perform a task. In many applications, mobile-machine navigation systems are employed to automatically adjust the heading of a mobile machine to keep the mobile machine close to such a target path as it travels. Many such mobile-machine navigation systems continually adjust the heading of a mobile machine whenever and as long as the mobile machine is not on a path, which may be a high percentage of the time the mobile machine is traveling. Such mobile-machine navigation systems may not be well-suited for some applications. For example, such a mobile-machine navigation system may cause undesirably rapid wear of the components of some skid-steer type steering systems by operating the steering system to make heading changes over an undesirably high percentage of the mobile machine's travel.

U.S. Pat. No. 5,925,080 to Shimbara et al. ("the '080 patent") shows a drive control system for automatically navigating a vehicle along a predetermined path, wherein the drive control system implements a dead band for reducing the frequency of heading changes. The drive control system of the '080 patent is configured to sense the position of a guide means that extends along the predetermined path and control the heading of the vehicle dependent upon the position of the vehicle with respect to the predetermined path. As long as the vehicle remains within a dead band surrounding the predetermined path, the drive control system operates the steering system of the vehicle to direct the vehicle in a straight line. Whenever the vehicle is outside the dead band, the drive control system of the '080 patent continuously operates the steering system to change the heading of the vehicle at a rate dependent upon the distance between the vehicle and the predetermined path.

Although the drive control system of the '080 patent does not operate the steering system to change the heading of the vehicle when the vehicle is within the dead band, certain disadvantages persist. For example, by continuously changing the heading of the vehicle whenever the vehicle is outside the dead band, the drive control system may operate the steering system to change the heading of the mobile machine over a higher percentage of the vehicle's travel than may be desirable for some applications. Additionally, because the drive control system makes heading changes without regard to upcoming changes in direction of the predetermined path, the vehicle may frequently reenter the dead band with a heading that will quickly direct the vehicle back out of the dead band.

The mobile-machine navigation system and methods of the present disclosure solve one or more of the problems set forth above.

SUMMARY OF THE INVENTION

One disclosed embodiment relates to a method of navigating a mobile machine dependent upon the relationship of the mobile machine to a target path. The method may include operating a steering system to change the heading of the mobile machine in response to the mobile machine deviating from a first navigational dead band. Additionally, the method may include subsequently operating the steering system to make a heading change of the mobile machine only in response to predetermined events, which may include operating the steering system to make a heading change of the mobile machine if the mobile machine deviates from a second navigational dead band.

Another embodiment relates to a mobile-machine navigation system for navigating a mobile machine. The mobile-machine navigation system includes navigation controls, which may include a steering system. The navigation controls may be configured to execute a method of navigating the mobile machine dependent upon a relationship of the mobile machine to a target path. The method of navigating the mobile machine may include operating in a first mode until the mobile machine deviates from a first navigational dead band. The method may further include, in response to the mobile machine deviating from a first navigational dead band, operating the steering system to change the heading of the mobile machine and, subsequently, operating in a second mode until the mobile machine reaches a target zone, the target zone including the target path. Additionally, the method may include, in response to the mobile machine reaching the target zone, operating the steering system to make a heading change and, subsequently, returning to operation in the first mode.

A further disclosed embodiment relates to a method of navigating a mobile machine dependent upon the relationship of the mobile machine to a target path and a first navigational dead band defined as a function of the target path. The method may include, in response to each deviation of the mobile machine from the first navigational dead band, operating a steering system to make a heading change to direct the mobile machine toward a portion of the target path ahead of a point on the target path nearest the mobile machine.

Another disclosed embodiment relates to a mobile-machine navigation system for navigating a mobile machine. The mobile-machine navigation system includes navigation controls, which may include a steering system. The navigation controls may be configured to execute a method of navigating the mobile machine dependent upon a relationship of the mobile machine to a target path and a target zone that includes the target path. The method of navigating the mobile machine may include, in response to the mobile machine moving from off the target zone onto the target zone, operating the steering system to make a heading change to direct the mobile machine toward a portion of the target path ahead of a point on the target path nearest the mobile machine.

DETAILED DESCRIPTION

Figure 1:
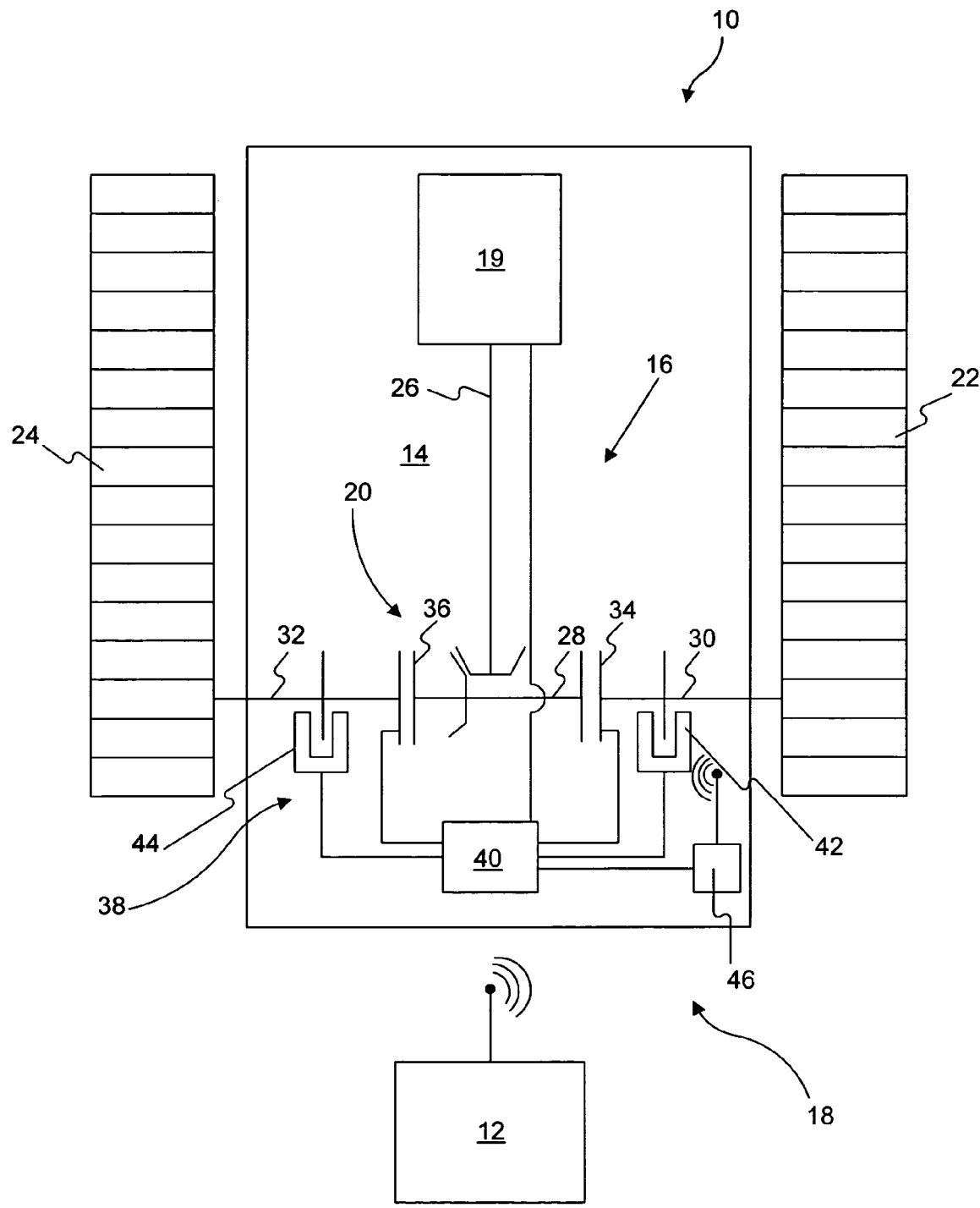
FIG. 1 shows one embodiment of a mobile-machine navigation system according to the present disclosure.

FIG. 1 illustrates one embodiment of a mobile-machine navigation system 10 according to the present disclosure and a position information system 12. Mobile-machine navigation system 10 may include a mobile machine 14, a propulsion system 16, and navigation controls 18. Mobile machine 14 may be a land-based machine, an aircraft, a watercraft, a spacecraft, or some combination thereof. As is shown in FIG. 1, in some embodiments, mobile machine 14 may include all components of propulsion system 16 and all components of navigation controls 18.

Propulsion system 16 may be any system of components configured to propel mobile machine 14. In some embodiments, propulsion system 16 may include a power source 19, a power-transfer system 20, and propulsion devices 22, 24. Power source 19 may be any type of device configured to produce a power output, including, but not limited to, a diesel engine, a gasoline engine, a gaseous fuel driven engine, a turbine engine, an electric motor, and a hydraulic motor. Power-transfer system 20 may be any system of components configured to transfer power from power source 19 to propulsion devices 22, 24. For example, power-transfer system 20 may include drive members 26, 28, 30, 32 and clutches 34, 36 connecting power source 19 to propulsion devices 22, 24.

Propulsion devices 22, 24 may be any type of device configured to receive power produced by power source 19 and propel mobile machine 14 by transferring that power to the environment surrounding mobile machine 14. For example, as is shown in FIG. 1, propulsion devices 22, 24 may be track-laying units. Alternatively, one or both of propulsion devices 22, 24 may be wheels, other types of devices configured to transmit power to the ground, propellers, or other types of devices configured to move fluid to provide thrust for mobile machine 14.

Propulsion system 16 is not limited to the configuration shown in FIG. 1. For example, power-transfer system 20 may omit one or more of drive members 26, 28, 30, 32 and clutches 34, 36 and/or include various other power-transfer components not shown in FIG. 1. Additionally, power-transfer system 20 may include one or more power-conversion systems, such as an electric generator and an electric motor, connected between power source 19 and propulsion devices 22, 24. Furthermore, power source 19 may be a type of component configured to transfer power directly to the environment surrounding mobile machine 14, such as a jet engine or a rocket, and propulsion system 16 may omit power-transfer system 20 and propulsion devices 22, 24. Moreover, in some embodiments, some or all of the components of propulsion system 16 may be external to mobile machine 14.

Navigation controls 18 may be any system of components configured to adjust the course of mobile machine 14. Navigation controls 18 may include a steering system 38 and a controller 40 operatively connected to steering system 38. As is shown in FIG. 1, steering system 38 may be a skid-steer type steering system configured to change the heading of mobile machine 14 by inducing a speed differential between propulsion device 22 and propulsion device 24. As used herein, the term skid-steer type steering system refers to any type of steering system operable to change the course of mobile machine 14 by inducing a speed differential between propulsion devices, including track units, wheels, or other propulsion devices, in a manner that causes some lateral skidding of one or more of those propulsion devices during heading changes. Steering system 38 may include clutches 34, 36 and brakes 42, 44. Brake 42 may be operable to selectively brake drive member 30 and propulsion device 22, and brake 44 may be operable to selectively brake drive member 32 and propulsion device 24.

Controller 40 may be configured to control steering system 38 dependent upon various inputs. Controller 40 may include one or more processors (not shown) and one or more memory devices (not shown). Controller 40 may be communicatively linked to various sensors (not shown) and/or other controllers, so that controller 40 may receive inputs relating to the operating states of various systems of mobile machine 14 and/or inputs relating to motion of mobile machine 14. Additionally, controller 40 may be communicatively linked to position information system 12 through a transceiver 46. Controller 40 may be operatively connected to clutches 34, 36 and brakes 42, 44, and controller 40 may be configured to modulate clutches 34, 36 and brakes 42, 44 dependent upon inputs from various sensors, controllers, and/or position information system 12. Additionally, controller 40 may be operatively linked to power source 19 and/or various other components of propulsion system 16, such that controller 18 may control whether propulsion system 16 propels mobile machine 14.

Navigation controls 18 are not limited to the configuration shown in FIG. 1. For example, rather than a skid-steer type steering system, steering system 38 may be other types of steering systems, such as a steering system configured to adjust the course of mobile machine 14 by pivoting one or more wheels, runners, rudders, or other similar components. Furthermore, in some embodiments, steering system 38 may be one and the same system as propulsion system 16, with no components being unique to either. Moreover, in addition to, or in place of, controller 40, navigation controls 18 may include one or more other controllers and/or other types of logic systems, such as hardwired electric logic circuits, hydraulic logic systems, pneumatic logic systems, and/or mechanical logic systems. Additionally, rather than being contained entirely on mobile machine 14, some or all of the components of navigation controls 18 may be external to mobile machine 14.

Position information system 12 may be any type of system configured to provide navigation controls 18 with information relating to the position, heading, and/or speed of mobile machine 14. For example, position information system 12 may be a global positioning system configured to transmit information relating to the position and heading of mobile machine 14 to transceiver 46.

INDUSTRIAL APPLICABILITY

Mobile-machine navigation system 10 may have application in any system requiring controlled movement of a mobile machine 14. In some applications, mobile-machine navigation system 10 may be implemented to provide substantially autonomous navigation of a mobile machine 14.

Navigation controls 18 may control the movement of mobile machine 14 by selectively operating propulsion system 16 to propel mobile machine 14 and selectively operating steering system 38 to adjust the heading of mobile machine 14. Navigation controls 18 may cause propulsion system 16 to propel mobile machine 14 by producing power with power source 19 and transmitting that power through drive members 26, 28, through one or both of clutches 34, 36 and one or both of drive members 30, 32, to one or both of propulsion devices 22, 24. Navigation controls 18 may operate steering system 38 to direct mobile machine 14 in a straight line by causing both clutches 34, 36 to be fully engaged and causing both brakes 42, 44 to be fully released, such that propulsion system 16 drives propulsion devices 22, 24 at substantially the same speed. Navigation controls 18 may operate steering system 38 to change the heading of mobile machine 14 by partially or fully disengaging one of clutches 34, 36 to induce a speed differential between propulsion devices 22, 24. Additionally, navigation controls 18 may expedite a heading change by braking the slower moving propulsion device 22, 24 with the associated brake 42, 44.

In some embodiments, navigation controls 18 may guide mobile machine 14 toward a target destination by operating propulsion system 16 and steering system 38 to keep mobile machine 14 on or close to a target path that extends to the target destination. In such embodiments, controller 40 may control propulsion system 16 and steering system 38 dependent upon the relationship of mobile machine 14 to the target path. In order to do so, controller 40 may receive information relating to the position, heading, and/or speed of mobile machine 14 from position information system 12 and/or controller 40 may receive such information from other sources such as sensors and/or other controllers of mobile-machine navigation system 10. Additionally, the target path may be preprogrammed into controller 40, controller 40 may receive the definition of the target path from an external information source, or controller 40 may define the target path dependent upon various inputs.

Figure 2A:
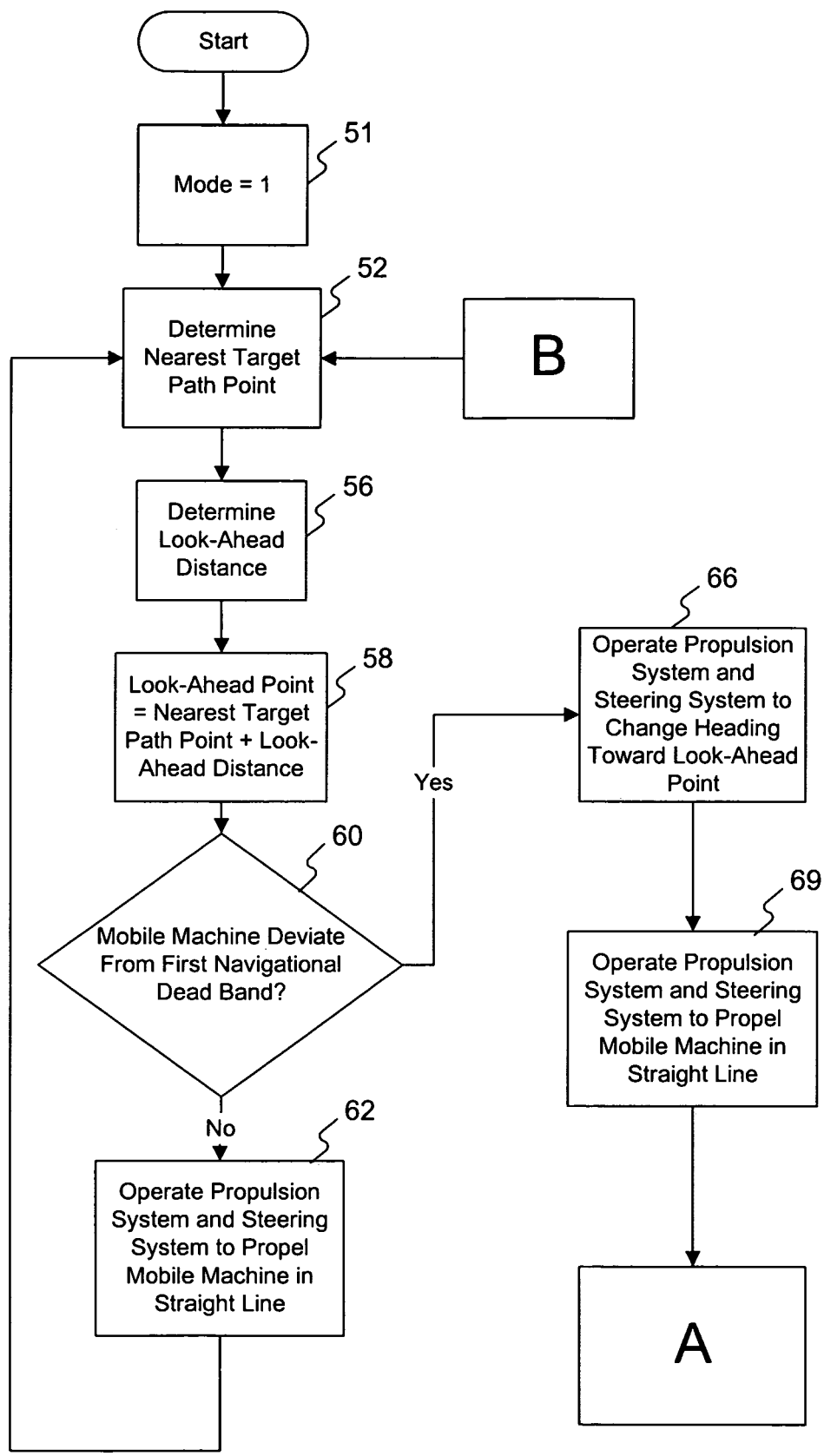
FIG. 2A is a first portion of a flow chart illustrating a method for navigating a mobile machine.
Figure 2B:
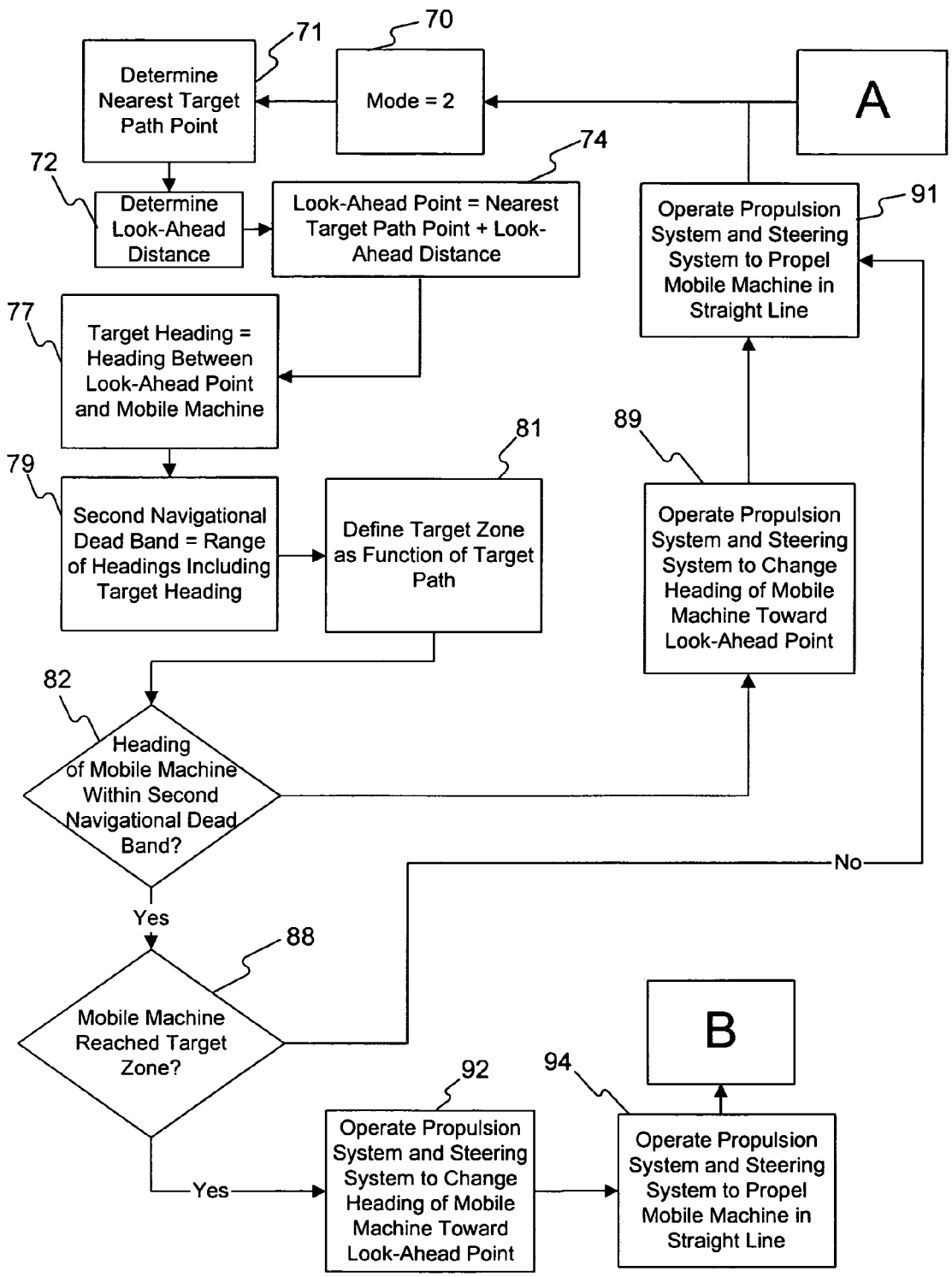
FIG. 2B is a second portion of the flow chart of FIG. 2A.

FIGS. 2A and 2B contain a flow chart illustrating one embodiment of a method according to which navigation controls 18 may navigate mobile machine 14 dependent upon the relationship between mobile machine 14 and a target path. FIGS. 3A-3G show an exemplary target path 48 and an exemplary series of positions through which navigation controls 18 may navigate mobile machine 14 as a result of executing the method embodied in FIGS. 2A and 2B.

Figure 3A:
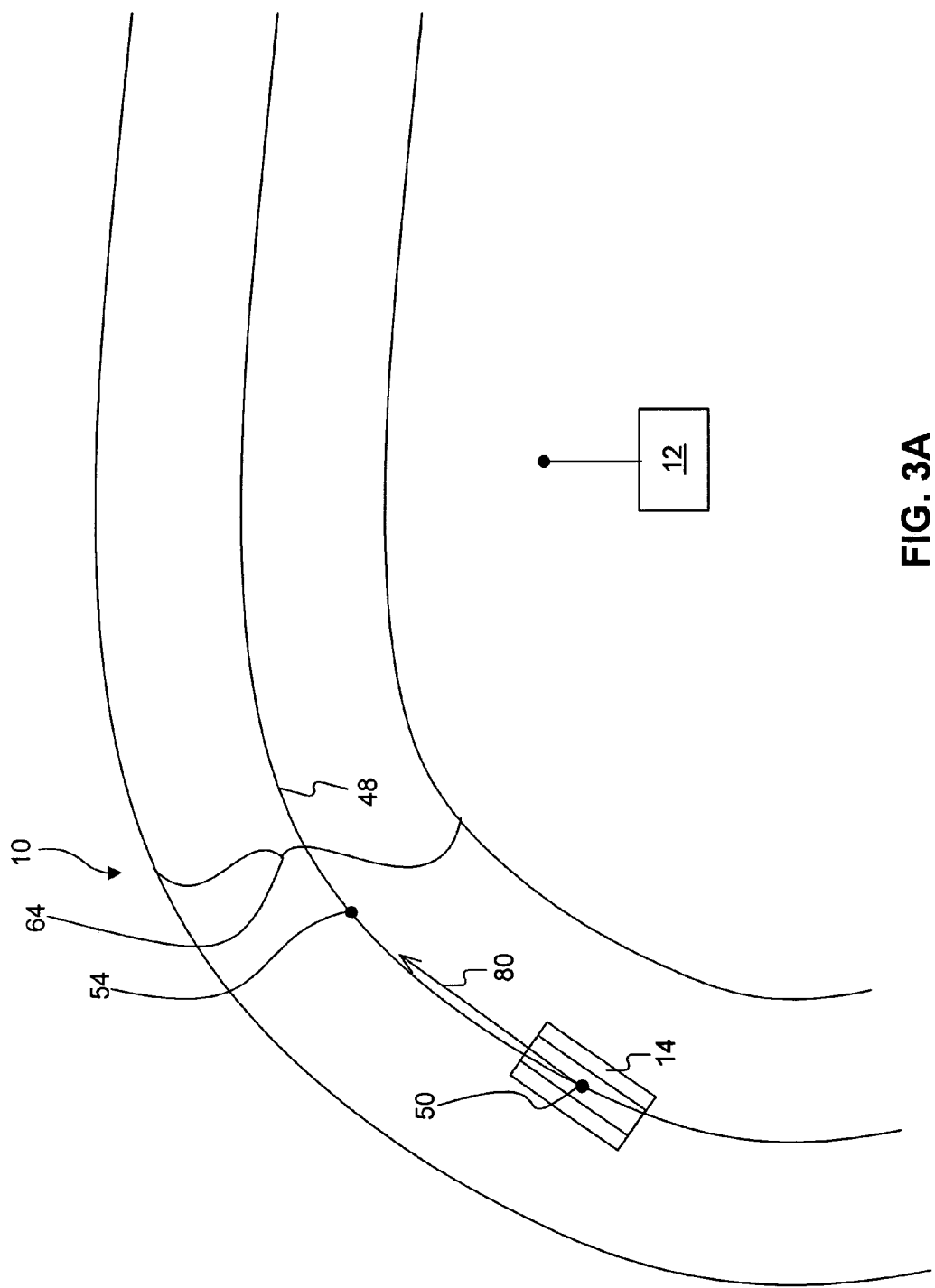
FIG. 3A is a schematic illustration of a mobile machine in a first position with respect to a target path.

Navigation controls 18 may start in a first mode of operation. (step 51) In the first mode of operation, navigation controls 18 may initially determine the location of some reference points on target path 48. Navigation controls 18 may determine the location of a nearest target path point 50 on target path 48 (step 52), which is the point on target path 48 closest to mobile machine 14. If mobile machine 14 is on target path 48, as is shown in FIG. 3A, nearest target path point 50 is simply the location of mobile machine 14.

After determining the location of nearest target path point 50, navigation controls 18 may determine the location of a "look-ahead" point 54 on target path 48. As discussed below, look-ahead point 54 may be the point toward which navigation controls 18 direct mobile machine 14 on the occasions that navigation controls 18 change the heading of mobile machine 14. In order to determine the location of look-ahead point 54, navigation controls 18 may determine a "look-ahead" distance (step 56) as a function of various factors, such as the speed of mobile machine 14. Navigation controls 18 may then define the look-ahead point 54 as the point on target path 48 ahead of nearest target path point 50 by the look-ahead distance. (step 58)

After determining look-ahead point 54, navigation controls 18 may determine whether mobile machine 14 is within a first navigational dead band 64. (step 60) As is shown in FIGS. 3A-3G, first navigational dead band 64 may be a range of positions that includes target path 48. If mobile machine 14 is within first navigational dead band 64, navigation controls 18 may operate propulsion system 16 and steering system 38 to propel mobile machine 14 in a straight line. (step 62) Subsequently, as long as mobile machine 14 remains within first navigational dead band 64, navigation controls 18 may continue operating propulsion system 16 and steering system 38 to propel mobile machine 14 in a straight line, while repeatedly redefining look-ahead point 54 as mobile machine 14 moves.

Figure 3B:
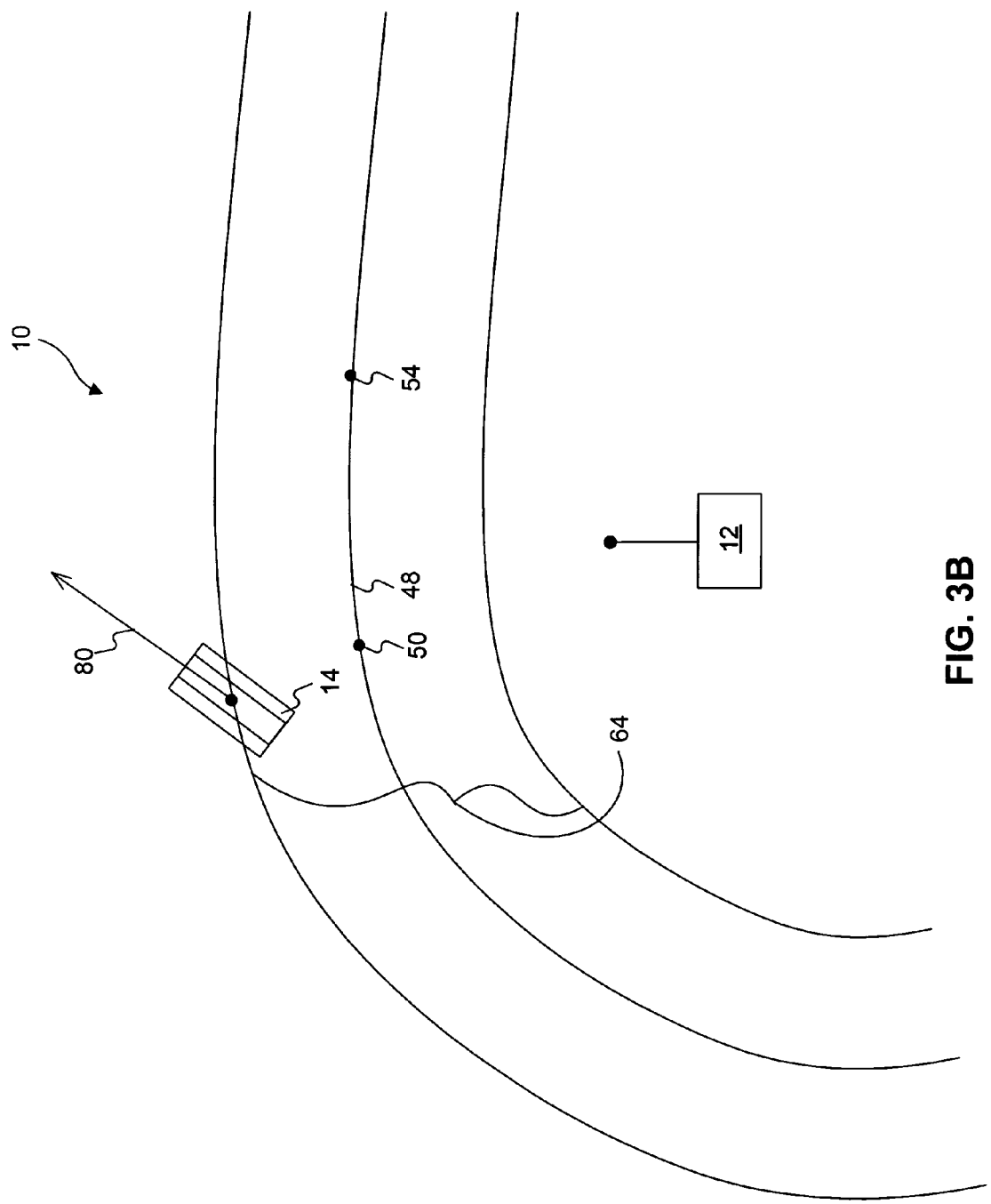
FIG. 3B is a schematic illustration of the mobile machine of FIG. 3A in a second position with respect to the target path.

However, a number of factors may cause mobile machine 14 to deviate from first navigational dead band 64. For example, first navigational dead band 64 may curve sufficiently that straight-line movement of mobile machine 14 inevitably carries mobile machine 14 outside of first navigational dead band 64, as is shown in FIGS. 3A and 3B. Additionally, despite navigation controls 18 operating propulsion system 16 and steering system 38 to propel mobile machine 14 in a straight line, various external influences may cause unintended heading changes of mobile machine 14. If mobile machine 14 deviates from first navigational dead band 64, navigation controls 18 may operate propulsion system 16 and steering system 38 to change the heading of mobile machine 14 to be toward look-ahead point 54 (step 66) Such a response is reflected in FIGS. 3B and 3C. Thereafter, navigation controls 18 may resume straight line-propulsion of mobile machine 14. (step 69)

Additionally, in response to mobile machine 14 deviating from first navigational dead band 64, navigation controls 18 may enter a second mode of operation. (step 70 (FIG. 2B)) In the second mode of operation, navigation controls 18 may redefine look-ahead point 54. (steps 71, 72, 74) In some embodiments, navigation controls 18 may calculate the look-ahead distance differently when operating in the second mode than when operating in the first mode. For example, navigation controls 18 may employ an algorithm that results in the look-ahead distance being generally greater when operating in the second mode than when operating in the first mode.

Additionally, when operating in the second mode, navigation controls 18 may define different references for determining when to make heading changes. Navigation controls 18 may define a target heading 75 (FIG. 3C) as a heading between mobile machine 14 and look-ahead point 54. (step 77) Navigation controls 18 may define a second navigational dead band 76 as a range of headings that includes target heading 75. (step 79) For example, navigation controls 18 may define second navigational dead band 76 as a range of headings bisected by target heading 75.

Figure 3C:
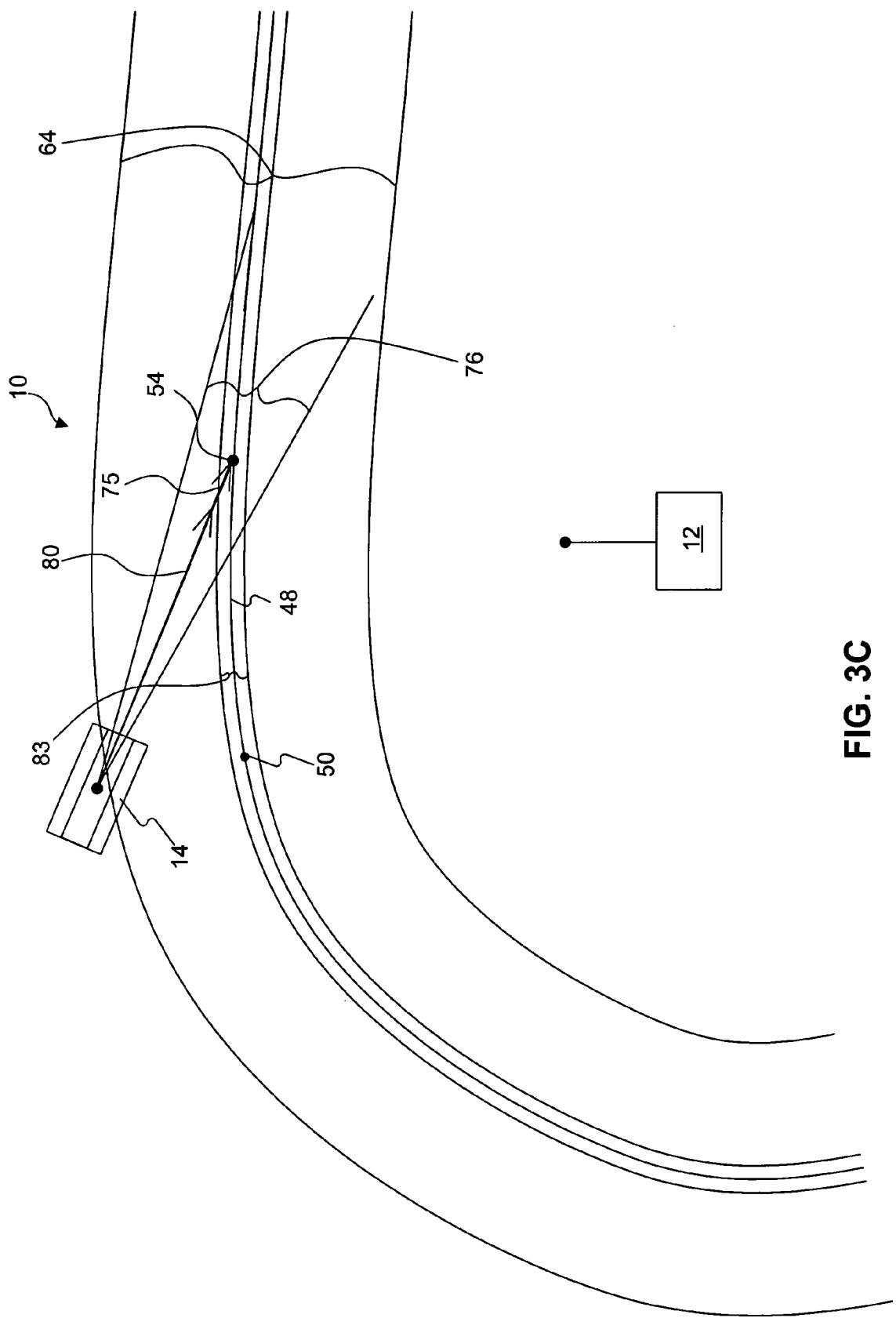
FIG. 3C is a schematic illustration of the mobile machine of FIG. 3A in a third position with respect to the target path.
Figure 3D:
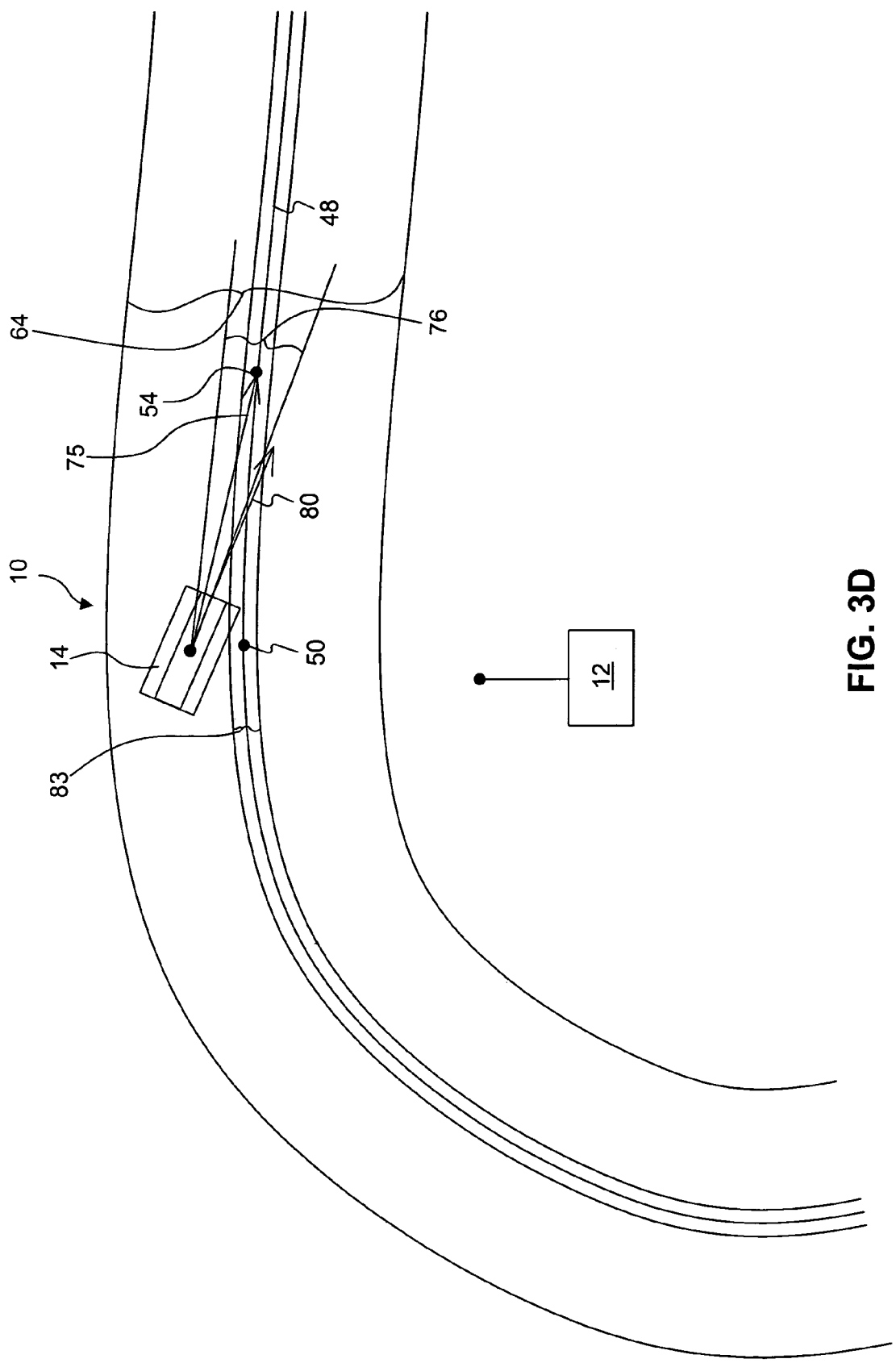
FIG. 3D is a schematic illustration of the mobile machine of FIG. 3A in a fourth position with respect to the target path.
Figure 3E:
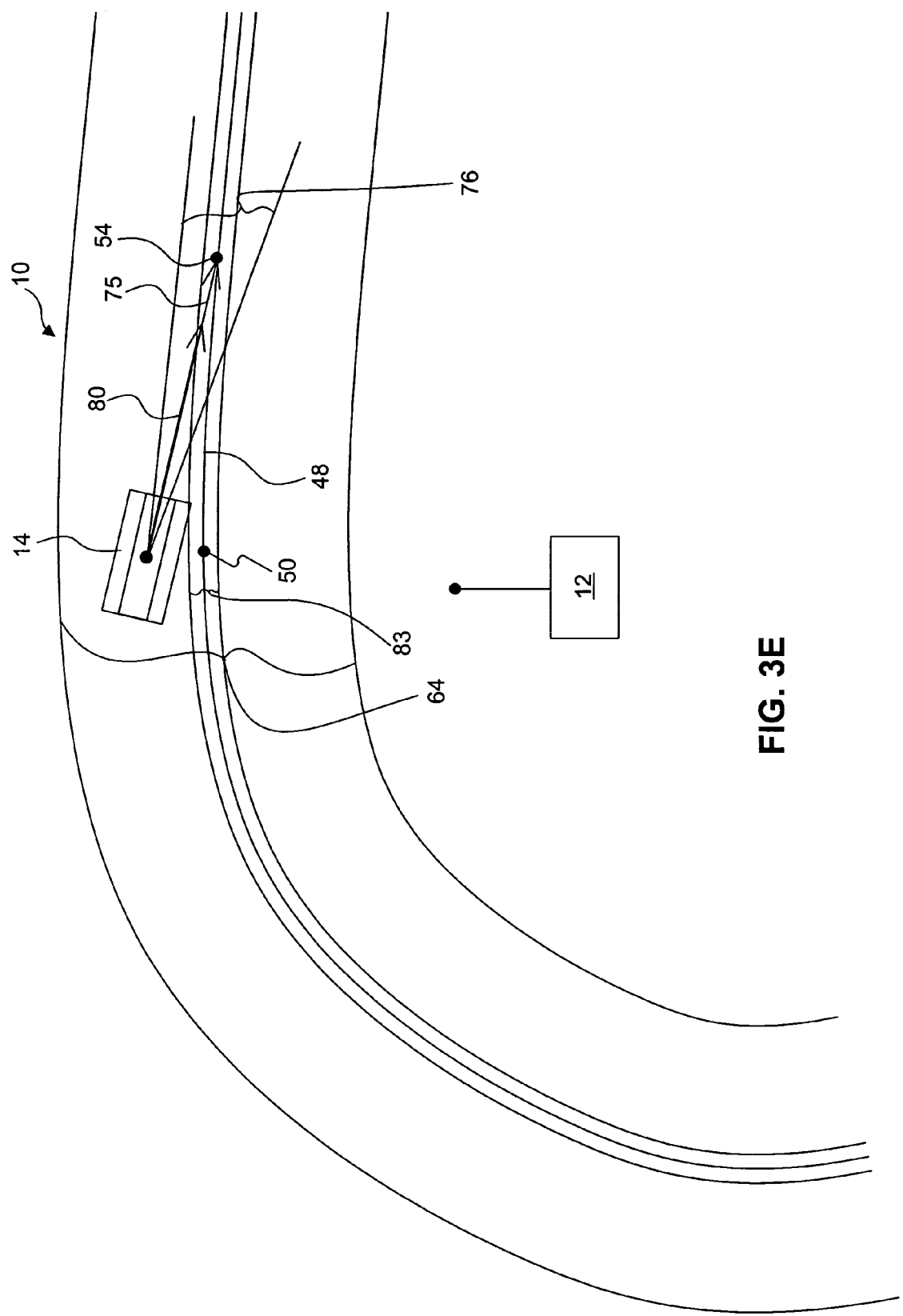
FIG. 3E is a schematic illustration of the mobile machine of FIG. 3A in a fifth position with respect to the target path.
Figure 3F:
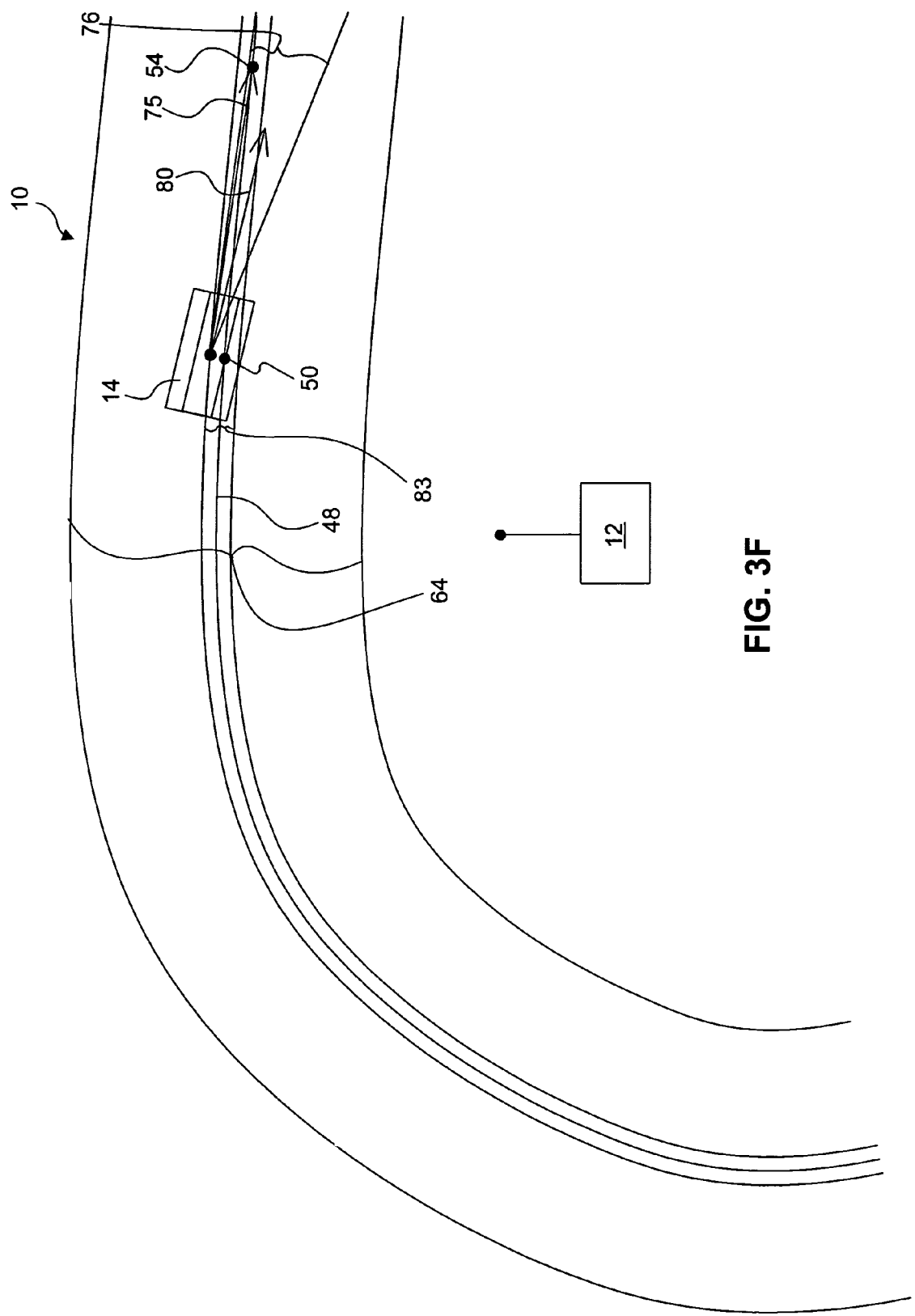
FIG. 3F is a schematic illustration of the mobile machine of FIG. 3A in a sixth position with respect to the target path.
Figure 3G:
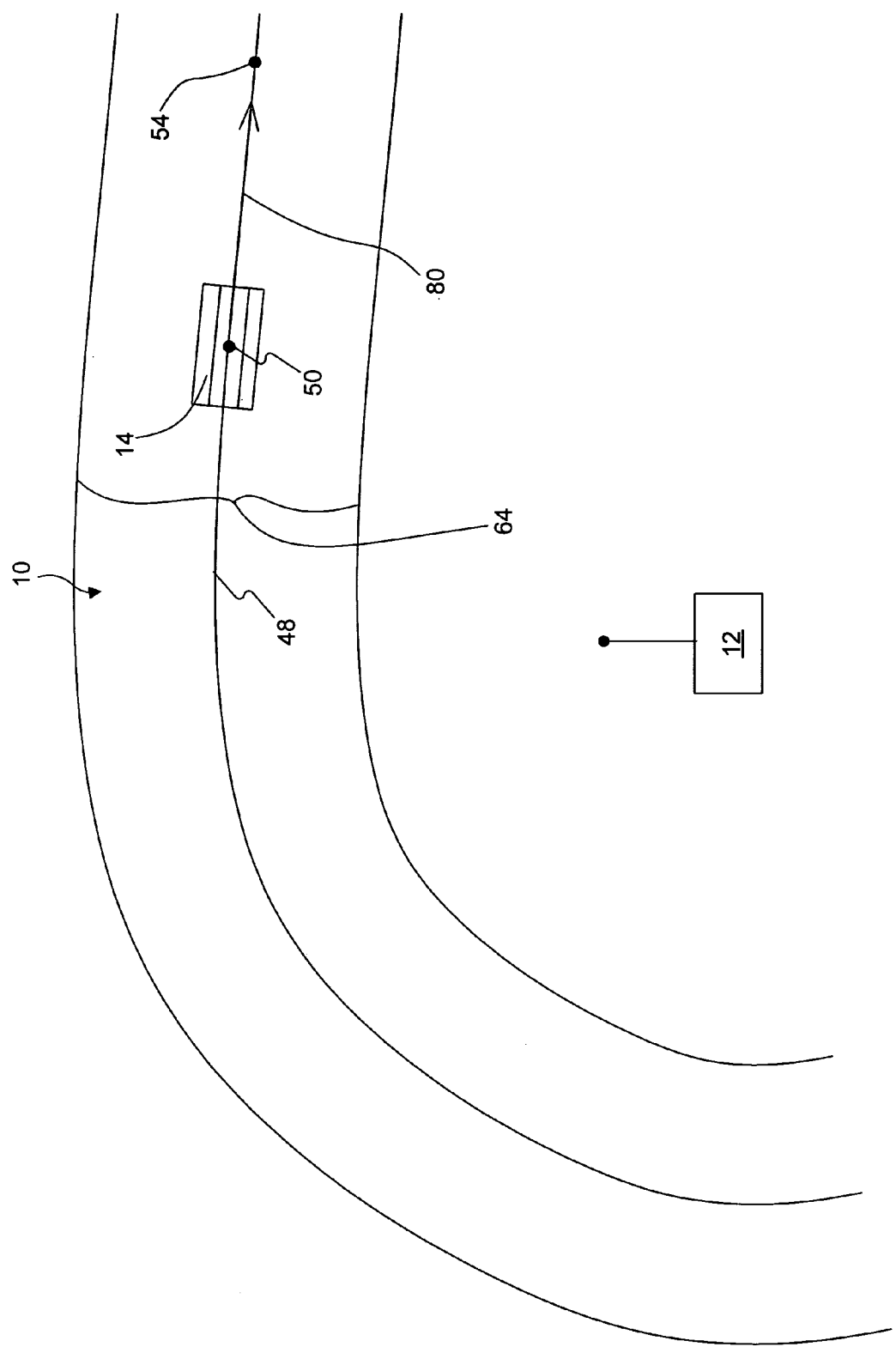
FIG. 3G is a schematic illustration of the mobile machine of FIG. 3A in a seventh position with respect to the target path.

Additionally, navigation controls 18 may define a target zone 83 as a function of target path 48. (step 81) As is shown in FIG. 3C, target zone 83 may be defined as a range of positions that includes target path 48. Navigation controls 18 may define target zone 83 as a function of various other factors in addition to target path 48, such as the speed and heading of mobile machine 14.

Navigation controls 18 may then determine whether to change the heading of mobile machine 14 again. Navigation controls 18 may determine whether the actual heading 80 of mobile machine 14 is within second navigational dead band 76. (step 82) If so, navigation controls 18 may determine whether mobile machine 14 has reached target zone 83. (step 88) If not, navigation controls 18 may continue straight line propulsion of mobile machine 14 (step 91), redefine look-ahead point 54 (steps 71, 72, 74), redefine second navigational dead band 76 (step 79), redefine target zone 83 (step 81), and determine again whether to make a heading change (steps 82, 88). As long as heading 80 of mobile machine 14 remains within second navigational dead band 76, navigation controls 18 may continue this cycle until mobile machine 14 reaches target zone 83.

However, at least two factors may cause heading 80 of mobile machine 14 to deviate from second navigational dead band 76 before mobile machine 14 reaches target path 48. External influences may cause mobile machine 14 to change headings, such that its heading 80 deviates from second navigational dead band 76. Additionally, if mobile machine 14 does travel in a straight line, by repeatedly redefining second navigational dead band 76 as mobile machine 14 travels, navigation controls 18 may change the orientation of second navigational dead band 76 sufficiently that heading 80 of mobile machine 14 deviates from second navigational dead band 76. If heading 80 of mobile machine 14 deviates from second navigational dead band 76, navigation controls 18 may operate propulsion system 16 and steering system 38 to direct mobile machine 14 toward look-ahead point 54. (step 89) Such a response is reflected in FIGS. 3D and 3E. Subsequently, navigation controls 18 may resume the previous cycle.

When mobile machine 14 subsequently reaches target zone 83 (step 88), navigation controls 18 may also redirect mobile machine 14 toward look-ahead point 54. (step 92) Such a response is reflected in FIGS. 3F and 3G. Thereafter, navigation controls 18 may resume straight-line propulsion of mobile machine 14. (step 94) Additionally, in response to mobile machine 14 reaching target zone 83, navigation controls 18 may return to the first mode of operation (step 51 (FIG. 2A)) and continue operating therein until mobile machine 14 again deviates from first navigational dead band 64.

Methods according to which navigation controls 18 may navigate mobile machine 14 are not limited to the embodiments discussed above in connection with FIGS. 2A, 2B, and 3A-3G. For example, target path 48 may be defined differently than discussed above and shown in FIGS. 3A-3G. While FIGS. 3A-3G show target path 48 as a continuous curve, in some embodiments, target path 48 may be a sequence of discreet points, a sequence of disconnected curves, a sequence of line segments, some combination thereof, or any other set of points with a defined sequence of progression toward a target destination. Additionally, target path 48 may be static, or navigation controls 18 may repeatedly redefine target path 48.

Furthermore, first navigational dead band 64, second navigational dead band 76, and/or target zone 83 may be defined differently than discussed above and shown in FIGS. 3A-3G. While FIGS. 3A-3G show first navigational dead band 64, second navigational dead band 76, and target zone 83 as regions bounded by continuous curves, navigation controls 18 may define one or more of them as simple, quantitative ranges of deviation of the position and/or heading of mobile machine 14 from target path 48 and/or target heading 75. Additionally, in some embodiments, first navigational dead band 64 and/or target zone 83 may be defined partially or wholly in terms of headings. Similarly, in some embodiments, second navigational dead band 76 may be defined partially or wholly in terms of positions. Additionally, first navigational dead band 64 may be dynamic and second navigational dead band 76 may be static. Similarly, rather than target zone 83 being dynamic as described above in connection with FIG. 2B, target zone 83 may be static. Furthermore, regardless of whether target zone 83 is static or dynamic, in some embodiments and/or circumstances, target zone 83 may be defined to be one and the same entity as target path 48.

Additionally, navigation controls 18 may perform some of the actions discussed above in different orders or simultaneously. For example, in some embodiments, navigation controls 18 may perform the process of repeatedly redefining look-ahead point 54 in parallel with the other actions shown in FIGS. 2A and 2B.

Furthermore, one or more of the actions shown in FIGS. 2A and 2B may be omitted and/or navigation controls 18 may perform one or more actions not shown in FIGS. 2A and 2B. For example, in some embodiments, when operating in the second mode, navigation controls 18 may make continuous heading changes of mobile machine 14, rather than employing second navigational dead band 76. Additionally, rather than repeatedly determining look-ahead point 54, navigation controls 18 may determine a point to redirect mobile machine 14 toward only before making a heading change of mobile machine 14. Furthermore, in some embodiments target zone 83 may be predefined, and navigation controls 18 may omit the action of defining target zone 83.

Additionally, rather than the methods described in connection with FIG. 2B for determining look-ahead point 54, navigation controls 18 may utilize any method that defines look-ahead point 54 as a point on target path 48 ahead of nearest target path point 50. For example, in embodiments where target path 48 is defined as a sequence of discreet points, navigation controls 18 may define look-ahead point 54 by determining a look-ahead distance and defining look-ahead point 54 as the first point on target path 48 ahead of nearest target path point 50 by at least the look-ahead distance. Alternatively, in embodiments where target path 48 is defined as a sequence of discrete points, navigation controls 18 may define look-ahead point 54 to be a certain number of points ahead of nearest target path point 50.

The disclosed methods may limit the number of heading changes necessary to keep mobile machine 14 tracking close to a target path. Responding to a deviation from the first navigational dead band with a heading change toward a forward portion of the target path creates the possibility of returning mobile machine 14 to the target path without any further heading changes. Implementing the second navigational dead band as described above increases the probability of returning mobile machine 14 to the target path without any further heading changes, while ensuring that mobile machine 14 does not wander unduly.

Additionally, when mobile machine 14 reaches target zone 83, redirecting mobile machine 14 toward a point ahead of it on target path 48 aligns mobile machine 14 with the general direction of the succeeding portion of target path 48. This may help ensure that mobile machine 14 may subsequently travel a long way before it again exits the first navigational dead band and another heading change is necessary. In embodiments where navigation controls 18 effect heading changes by modulating one or clutches and/or brakes, limiting the number of heading changes may significantly reduce wear and heating of the clutches and/or brakes.

Furthermore, in embodiments/circumstances such as those shown in FIGS. 3A-3G where target zone 83 includes area adjacent target path 48, mobile machine 14 may be less likely to overshoot target path 48. In such embodiments, initiating a heading change of mobile machine 14 when it reaches target zone 83 provides the space within target zone 83 for changing the heading of mobile machine 14 before mobile machine 14 crosses target path 48. Additionally, defining target zone 83 at least partially in terms of the speed and/or heading of mobile machine 14 may help ensure that navigation controls 18 initiate a heading change of mobile 14 far enough away from target path 14 to prevent mobile machine 14 from overshooting target path 48.

It will be apparent to those skilled in the art that various modifications and variations can be made in the disclosed mobile-machine navigation system and methods without departing from the scope of the disclosure. Other embodiments of the disclosed mobile-machine navigation system and methods will be apparent to those skilled in the art from consideration of the specification and practice of the mobile-machine navigation system and methods disclosed herein. It is intended that the specification and examples be considered as exemplary only, with a true scope of the disclosure being indicated by the following claims and their equivalents.

What is claim is:

1. A method of navigating a mobile machine dependent upon a relationship of the mobile machine to a target path, the method comprising:

in response to the mobile machine deviating from a first navigational dead band, operating a steering system to change the heading of the mobile machine, including directing the mobile machine toward the target path; and subsequently, while the mobile machine is travelling toward the target path, operating the steering system to make a heading change of the mobile machine only in response to predetermined events, the events including operating the steering system to make a heading change of the mobile machine if the mobile machine deviates from a second navigational dead band.

2. The method of claim 1, wherein the first navigational dead band is a range of positions including the target path.

3. The method of claim 1, wherein operating the steering system to make heading changes includes operating the steering system to induce a speed differential between a first propulsion device of the mobile machine and a second propulsion device of the mobile machine at least partially by modulating at least one clutch or brake.

4. The method of claim 1, wherein operating the steering system to make a heading change only in response to predetermined events further includes operating the steering system to change the heading of the mobile machine in response to the mobile machine reaching a target zone, the target zone including the target path.

5. The method of claim 4, further including:
subsequent to operating the steering system to change the heading of the mobile machine in response to the mobile machine reaching the target zone, operating the steering system to make a heading change only if the mobile machine again deviates from the first navigational dead band.

6. The method of claim 4, wherein the target zone includes only the target path.

7. The method of claim 1, further including:
as the mobile machine moves, repeatedly defining a look-ahead point on the target path ahead of a point on the target path nearest the mobile machine; and
wherein operating the steering system to make a heading change in response to the mobile machine deviating from the first navigational dead band includes operating the steering system to direct the mobile machine toward the look-ahead point.

8. The method of claim 1, further including:
as the mobile machine moves, repeatedly defining a look-ahead point on the target path ahead of a point on the target path nearest the mobile machine; and
wherein operating the steering system to make a heading change in response to the mobile machine deviating from the second navigational dead band includes operating the steering system to direct the mobile machine toward the look-ahead point.

9. The method of claim 1, wherein operating the steering system to make heading changes includes operating the steering system to induce a speed differential between a first propulsion device of the mobile machine and a second propulsion device of the mobile machine.

10. The method of claim 1, wherein:
the second navigational dead band includes a range of headings; and
operating the steering system to make a heading change in response to the mobile machine deviating from the second navigational dead band includes operating the steering system to make a heading change when the heading of the mobile machine deviates from the range of headings.

11. The method of claim 10, further including:
subsequent to making the heading change in response to the mobile machine deviating from the first navigational dead band, repeatedly
redefining a target heading of the mobile machine; and
redefining the range of headings as a function of the target heading.

12. A mobile-machine navigation system for navigating a mobile machine, the mobile-machine navigation system comprising:
navigation controls, including a steering system operable to adjust the heading of the mobile machine;
the navigation controls being configured to execute a method of navigating the mobile machine dependent upon the relationship of the mobile machine to a target path, the method of navigating the mobile machine including
operating in a first mode until the mobile machine deviates from a first navigational dead band;
in response to the mobile machine deviating from the first navigational dead band, operating the steering system to change the heading of the mobile machine, directing the mobile machine toward the target path and, subsequently, operating in a second mode until the mobile machine reaches a target zone, the target zone including the target path, wherein operating in the second mode includes, while the mobile machine is travelling toward the target path, operating the steering system to make a heading change only in response to the mobile machine deviating from a second navigational dead band and in response to the mobile machine reaching the target zone; and
in response to the mobile machine reaching the target zone, operating the steering system to make a heading change and, subsequently, returning to operation in the first mode.

13. The mobile-machine navigation system of claim 12, wherein the second navigational dead band is a range of headings.

14. The mobile-machine navigation system of claim 12, wherein operating in the first mode includes allowing the mobile machine to travel without operating the steering system to make a heading change.

15. The mobile-machine navigation system of claim 14, wherein the method of navigating the mobile machine further includes:
as the mobile machine travels, repeatedly redefining a look-ahead point on the target path ahead of a point on the target path nearest the mobile machine;
wherein operating in the first mode includes defining the look-ahead point in a first manner; and
wherein operating in the second mode includes defining the look-ahead point in a second manner.

16. The mobile-machine navigation system of claim 12, wherein the target zone includes only the target path.

17. A method of navigating a mobile machine dependent upon the relationship of the mobile machine to a target path and a first navigational dead band defined as a function of the target path, the method comprising:
in response to each deviation of the mobile machine from the first navigational dead band, operating a steering system to make a heading change to direct the mobile machine toward a portion of the target path ahead of a point on the target path nearest the mobile machine;
as the mobile machine travels, repeatedly defining a look-ahead point on the target path ahead of the point on the target path nearest the mobile machine, wherein operating the steering system to make a heading change in response to each deviation of the mobile machine from the first navigational dead band includes operating the steering system to redirect the mobile machine toward the look-ahead point;
subsequent to redirecting the mobile machine, determining when the machine reaches a target zone that includes the target path, and operating the steering system to make a second heading change toward a portion of the target oath ahead of a point on the target oath nearest the mobile machine; and between making the heading change in response to each deviation of the mobile machine from the first navigational dead band and making the second heading change in response to reaching the target zone, operating the steering system to make an intermediate heading change only in response to the mobile machine deviating from a second navigational dead band.

18. The method of claim 17, wherein defining the look-ahead point includes determining a look-ahead distance as a function of the speed of the mobile machine and defining the look-ahead point as a point on the target path ahead of the point on target path nearest the mobile machine by the look-ahead distance.

19. The method of claim 17, further including:

subsequent to making the heading change in response to the mobile machine reaching the target zone, allowing the mobile machine to travel without operating the steering system to make a heading change until the mobile machine again deviates from the first navigational dead band.

20. The method of claim 17, wherein the target zone includes only the target path.

21. The method of claim 17, wherein the first navigational dead band is a range of positions including the target path.

22. The method of claim 17, wherein operating the steering system to change the heading of the mobile machine includes modulating at least one clutch or brake.

23. A mobile-machine navigation system for navigating a mobile machine, the mobile-machine navigation system comprising:

navigation controls, the navigation controls including a steering system; and the navigation controls being configured to execute a method of navigating the mobile machine dependent upon a relationship of the mobile machine to a target path and a target zone, wherein the target zone includes the target path and a range of positions adjacent the target path, the method of navigating the mobile machine including in response to the mobile machine moving from off the target zone onto the target zone and before the mobile machine reaches the target path, operating the steering system to make a heading change toward a portion of the target path ahead of a point on the target path nearest the mobile machine.

24. The mobile-machine navigation system of claim 23, wherein the method of navigating the mobile machine further includes:

subsequent to operating the steering system to make a heading change in response to the mobile machine moving onto the target zone, allowing the mobile machine to travel without operating the steering system to make heading changes until the mobile machine deviates from a navigational dead band that includes the target path.

25. The mobile-machine navigation system of claim 23, wherein:

the method of navigating the mobile machine further includes repeatedly defining a look-ahead point on the target path ahead of the point on the target path nearest the mobile machine; and operating the steering system to make a heading change in response to the mobile machine moving onto the target zone includes operating the steering system to direct the mobile machine toward the look-ahead point.

26. The mobile-machine navigation system of claim 23, wherein the method of navigating the mobile machine further includes:

prior to making the heading change in response to the mobile machine moving onto the target zone, in response to the mobile machine deviating from a first navigational dead band, operating the steering system to make a heading change toward a portion of the target path ahead of a point on the target path nearest the mobile machine.

27. The mobile-machine navigation system of claim 26, wherein the method of navigating the mobile machine further includes:

between making the heading change in response to the mobile machine deviating from the first navigational dead band and making the heading change in response to the mobile machine moving onto the target zone, operating the steering system to make a heading change only in response to the mobile machine deviating from a second navigational dead band.

28. The mobile-machine navigation system of claim 26, wherein the first navigational dead band is a range of positions including the target path.

29. The mobile-machine navigation system of claim 23, wherein the steering system is configured to effect heading changes of the mobile machine by inducing a speed differential between a first propulsion device and a second propulsion device.

30. The mobile-machine navigation system of claim 23, wherein the target zone includes only the target path.

31. The mobile-machine navigation system of claim 23, wherein the steering system is configured to effect heading changes of the mobile machine by inducing a speed differential between a first propulsion device and a second propulsion device at least partially by modulating at least one clutch or brake.

* * * * *

UNITED STATES PATENT AND TRADEMARK OFFICE
CERTIFICATE OF CORRECTION

PATENT NO.         : 7,596,451 B2                                                Page 1 of 1
APPLICATION NO.    : 11/326506
DATED              : September 29, 2009
INVENTOR(S)        : Stoller et al.

It is certified that error appears in the above-identified patent and that said Letters Patent is hereby corrected as shown below:

Please correct the Claims as follows:
Column 8, line 56 (above claim 1), delete "claim" and insert -- claimed --.

Column 11, line 3, in claim 17, before "ahead" delete "oath" and insert -- path --.

Column 11, line 3, in claim 17, after "target" delete "oath" and insert -- path --.

Signed and Sealed this

Thirtieth Day of March, 2010

David J. Kappos
*Director of the United States Patent and Trademark Office*